United States Patent [19]
Balsom

[11] Patent Number: 5,592,596
[45] Date of Patent: Jan. 7, 1997

[54] SYSTEM AND METHOD FOR THE AUTOMATIC PRINTING OF STORAGE MEDIA LABELS

[75] Inventor: James Balsom, Poway, Calif.

[73] Assignees: Sony Corporation, Tokyo, Japan; Sony Electronics Inc., Park Ridge, N.J.

[21] Appl. No.: 488,712

[22] Filed: Jun. 8, 1995

[51] Int. Cl.⁶ .................................................. G06K 15/00
[52] U.S. Cl. ........................................ 395/117; 395/106
[58] Field of Search ................................ 395/117, 115, 395/113, 112, 161, 106; 347/2, 4; 101/484; 156/387, 542; 400/120.18; 369/30, 36

[56] References Cited

U.S. PATENT DOCUMENTS

| | | |
|---|---|---|
| 4,805,119 | 2/1989 | Maeda et al. |
| 5,317,337 | 5/1994 | Ewaldt ................................ 347/2 |
| 5,375,113 | 12/1994 | Pollard et al. |
| 5,427,029 | 6/1995 | Dumke ................................ 101/484 |

Primary Examiner—Arthur G. Evans
Attorney, Agent, or Firm—Lise A. Rode; Jerry A. Miller

[57] ABSTRACT

A system and method of automatically printing a label for optical disk cartridges residing in an optical disk cartridge storage and retrieval device, wherein each of a first number these optical disk cartridges is associated with a media ID. If the controller of the optical disk cartridge storage and retrieval device determines that a label flag is not associated with the selected optical disk cartridge, the controller will cause a printer to print a label including the media ID associated with the selected optical disk cartridge. The printer may be an external device connected to the optical disk cartridge storage and retrieval device, or it may be integrated within the optical disk cartridge storage and retrieval device. Once the controller has sent a command to the printer to print the label, a label flag is written to data storage within the optical disk cartridge storage and retrieval device to indicate that a label has been printed for the selected optical disk cartridge.

24 Claims, 3 Drawing Sheets

SYSTEM AND METHOD FOR THE AUTOMATIC PRINTING OF STORAGE MEDIA LABELS

RELATED APPLICATIONS

This invention is related to the invention of the patent application entitled "System and Method for the Storage and Retrieval of Off-Line Preformatted Optical Media" (James Balsom, inventor), Attorney's Docket No.: 50H1104, U.S. Ser. No. 08/444,323, filed May 18, 1995, assigned to the assignee of the present invention, and incorporated by reference herein.

BACKGROUND OF THE INVENTION

1. Field of Invention

This invention relates to the field of media management. More particularly, this invention relates to a system and method for the automatic printing of labels for storage media; and, in particular, optical disk cartridges.

2. General Background

For purposes of simplicity, the following discussion will be limited to the labeling of optical disk cartridges. It will be understood, however, that the present invention is not so limited, and may be expanded to include non-optical storage media such as magnetic cassette cartridges.

Recently, as the requirements for access to larger amounts of data and other information increases, there is a concomitant demand for more flexible, expandable mass storage. Magneto-optical and other erasable optical disks have become increasingly popular for storing data, given that substantial amount of information may be stored in digital format in these high density disks, information may be readily written to and erased or read from these disks, and such disks are generally impervious to stray magnetic fields at room temperatures. In light of the aforementioned advantages, erasable optical disks have become particularly popular with users who require substantial libraries of cataloged information. For example, sales and marketing departments may use such disks in order to store catalogs of financial data, graphics, and other information.

In addition, optical disk cartridge storage and retrieval devices have been proposed which allow for the storage and retrieval of any of a preselected number of erasable optical disk cartridges. One such optical disk cartridge storage and retrieval device is the OSL-2000, which is commercially available from Sony Electronics Inc., 1 Sony Drive, Park Ridge, N.J. 07656, and which may be seen with reference to FIGS. 1a and 1b. Optical disk cartridge storage and retrieval devices may be dedicated to a computer or may be connected to several workstations via a computer network such as a local area network (LAN) or wide are network (WAN). The following description relates to a network-enabled optical disk cartridge storage and retrieval device; however, it will be understood that the following description is substantially applicable to that of an optical disk cartridge storage and retrieval device dedicated to a single computer.

Referring to FIGS. 1a and 1b, it will be seen that the network-enabled optical storage and retrieval device 40 preferably includes two components: a control system or controller 42 and the optical storage and retrieval device 43 itself. The controller 42 preferably includes a CPU, memory (preferably EPROM and RAM), a disk controller (e.g., an SCSI disk controller), and a network interface (not shown). In addition, the controller 42 contains a hard disk drive (not shown) for holding software, including executable programs and an operating system, and for serving as a cache for reading and writing accesses to increase information transfer to and from the optical disks encased by the optical disk cartridges. The hard disk drive also can maintain directory pointers to all optical disk cartridges, including those stored off-line. The network-enabled optical disk cartridge storage and retrieval device 40 is connected at 49 to a LAN or WAN and acts as a server to provide storage resources to remote workstations connected to the network, and to allow these workstations to access information stored on the erasable optical disks contained in the optical storage and retrieval device 43.

The optical storage and retrieval device 43 stores up to, for example, twenty optical disk cartridges (not shown) in one or more racks in an array of horizontally-oriented storage slots 46. These storage slots are arranged in one or more vertical columns so that the optical disk cartridges sit horizontally one on top of another in the individual slots 46. A cartridge retrieval arm or mechanism 45 which is movable to a position adjacent one of such slots 46, is then activated to retrieve a selected disk 48 for reading/writing/erasing upon command from, and under the control of, either a central microprocessor located within the device or under the control of an external controller connected thereto. Read/write operations occur via a laser light beam imparted on the optical disk through an aperture in the optical disk cartridge. Cartridges stored in the device and retrievable by the cartridge retrieval arm or mechanism 45, are deemed "near-line", since they may be readily placed "on-line" via the cartridge retrieval arm or mechanism 45. The optical disk cartridges may be exchanged by ejection of a particular cartridge and insertion of another cartridge through a "mail" slot 44 in the device. These optical disk cartridge storage and retrieval devices are commonly referred to as "jukeboxes", given their similarity to the mechanical devices used for playing audio recordings popularized in the 1930's.

In operation, a workstation (not shown) connected to the network will send a request to access information from one of the optical disk cartridges which may be stored either near-line in the network-enabled optical storage and retrieval device 40, or off-line in storage. The request to access data is generally made by a "volume" or "media" ID. This media ID constitutes a name assigned to any number of optical disk cartridges associated by the type of information stored on the optical disks encased by the cartridges. For example, if one were using the network-enabled optical storage and retrieval device in the sales and marketing area, one media ID might be associated with three disk cartridges including competitors' sales information, while a separate media ID might be associated with five disk cartridges including invoices, expense reports, and general accounting information. Because the network-enabled optical storage and retrieval device 40 maintains a list of the status of disk cartridges including those which are off-line, and a media ID can be associated with a limitless number of these optical disk cartridges, new disk cartridges can be readily added to an already existing group of optical disk cartridges associated with a particular media ID. The effect is to give the workstation user unlimited storage capacity for the particular data or other information which he is managing.

After receiving the request to access the desired information, the CPU of the controller 42 preferably communicates with the network-enabled optical storage and retrieval device cartridge retrieval arm 45 through an SCSI interface, and the server software sends instructions to the cartridge retrieval arm 45 to move the optical disk cartridges between the storage slots 46 and the optical disk drive 47 for read and write operations. An application in the optical storage and retrieval device server maintains a list of the status of the disk cartridges located in the optical storage and retrieval device, and, as indicated above, can also maintain directory pointers to off-line optical disk cartridges. Once the selected optical disk cartridge(s) 48 are moved to the optical disk drive 47, a workstation can access any information stored therein.

Systems and methods have been proposed for the management of off-line magnetic, optical, and magneto-optical disk cartridges used in conjunction with optical disk cartridge storage and retrieval devices, or "jukeboxes". One such proposal may be seen in the U.S. patent application entitled "System and Method for the Storage and Retrieval of Off-Line Preformatted Optical Media", Ser. No. 08/444,323, which is assigned to the assignee of the present invention, and incorporated by reference herein. As seen in that application, a unique sequentially-numbered coded label selected from a series of sequentially-numbered coded labels is affixed to each of a plurality of optical disk cartridges which are stored either near-line in an optical disk storage and retrieval device or off-line in a storage area or warehouse. Each of the sequentially-numbered coded labels generally includes two parts: a first part including an alphanumeric code unique to the particular optical disk cartridge, and a second part including an optical code adjacent to the alphanumeric code. Each time a new cassette is ordered or consumed, the alphanumeric code is incremented and a label including this incremented code is affixed to the new disk cartridge. Each of the optical disks encased by the optical disk cartridges is then preformatted so that the unique alphanumeric code of the optical disk cartridge encasing the optical disk becomes the unique preformatted disk ID of the optical disk. A list of these preformatted disk ID's is then stored in data storage in the optical disk cartridge storage and retrieval device. A request to access a selected optical disk cartridge is made by a computer connected to the optical disk cartridges storage and retrieval device by a media ID associated with at least the selected optical disk cartridge, wherein the media ID also corresponds to at least one of the unique preformatted disk ID's. The data storage in the optical disk cartridge storage and retrieval device is then addressed according to this media ID and a controller determines whether the selected optical disk cartridge is located in the optical disk cartridge storage and retrieval device. If it is determined that the selected optical disk cartridge is not located in the optical disk cartridge storage and retrieval device, the computer displays a prompt to load the selected optical disk cartridge according to the unique preformatted disk ID. As the optical disk cartridges are generally sequentially organized off-line according to their respective alphanumeric code, and as the user is prompted to load a desired optical disk cartridge according to its preformatted disk ID which corresponds to this alphanumeric code, it will be appreciated that this system and method allows a user of an optical storage and retrieval device to readily locate a desired disk cartridge from a storage area and replace said disk upon completion of use of same.

While, as stated above, the optical disk cartridges are generally stored sequentially according to their alphanumeric codes, it may also be desirable to identify and/or organize the optical disk cartridges according to their media ID so that the user could readily identify what information is stored in same. (Again, the media ID constitutes a name assigned to any number of optical disk cartridges associated by the type of information stored on the optical disks encased by the cartridges). Consequently, it would be desirable to provide a label which indicates to the user the media ID with which the particular optical disk cartridge is associated in order that he can ascertain the type of information contained in said optical disk cartridge.

Although the user of the optical disk cartridge could write or type the media ID on a label, this is not always convenient, as the user would have to locate blank labels, and a writing tool or typewriter, all or some of which might not be readily available. Additionally, and particularly in the case handwritten labels, the writing is sometimes unclear and hard to read or understand.

It would therefore be desirable to provide a system and method of labeling storage media, in particular, optical disk cartridges, with their associated media IDs which do not require a user to manually write or type said media ID on the label.

Accordingly, it is one object of the present invention to provide a system and method of labeling storage media.

It is another object of the present invention to provide a system and method of labeling optical disk cartridges so that a user could readily identify said cartridges' associated media IDs.

It is still another object of the invention to provide a system and method of automatically printing a label to be externally affixed to an optical disk cartridge, the label including the disk cartridge's media ID.

SUMMARY OF THE INVENTION

A system and method of automatically printing a label for any of a plurality of optical disk cartridges residing in an optical disk cartridge storage and retrieval device, wherein each of a first number these optical disk cartridges is associated with a media ID. In accordance with one aspect of the invention, if a controller of the optical disk cartridge storage and retrieval device determines that a label flag is not associated with a selected one of this first number of optical disk cartridges, the controller will cause a printer to print a label including the media ID associated with the selected optical disk cartridge. Once the controller has sent a command to the printer to print the label, a label flag is written to data storage within the optical disk cartridge storage and retrieval device to indicate that a label is now associated with the selected optical disk cartridge. Although the printer is generally an external device connected to the optical disk cartridge storage and retrieval device, it will be appreciated that it may also be integrated within the optical disk cartridge storage and retrieval device.

Each of a first number of these plurality of optical disk cartridges may be associated with a flag bit, the associated flag bit and media ID being stored in data storage of the optical disk cartridge storage and retrieval device. The controller of the optical disk cartridge storage and retrieval device then determines whether the flag bit of the selected optical disk cartridge is in a set or reset condition. If the controller determines that the flag bit associated with the selected optical disk cartridge is in a set condition, it will cause a printer connected to the optical disk cartridge storage and retrieval device to print a label, and will reset the associated flag bit.

Thus the user will have a printed label readily available which clearly and distinctly identifies the optical disk cartridge's media ID and thus the information stored therein. A user will thus be able to quickly organize those optical disk cartridges according to the information stored therein through a quick visual inspection of the media ID printed on the label.

In accordance with another aspect of the invention, the label will also include time information, including the date the label was printed, in order to assist the user in determining when information was first stored in the optical disk cartridge.

In accordance with yet another aspect of the invention the optical disk cartridges are inserted and ejected through mail slots in the optical disk cartridge storage and retrieval device, and the controller makes the aforementioned determinations prior to ejection of the selected optical disk cartridge from the optical disk cartridge storage and retrieval device. In this manner, a user will have a printed label readily available upon ejection of the optical disk cartridge, and prior to replacement of the disk cartridge in the warehouse or other storage area.

BRIEF DESCRIPTION OF THE DRAWINGS

FIG. 1b shows a schematic of the optical disk cartridge storage and retrieval device of FIG. 1a.

DETAILED DESCRIPTION OF THE PREFERRED EMBODIMENT

An embodiment of the system and method for the automatic printing of labels for optical disk cartridges according to the present invention will now be described in detail with reference to the accompanying drawings.

Figure 1A:
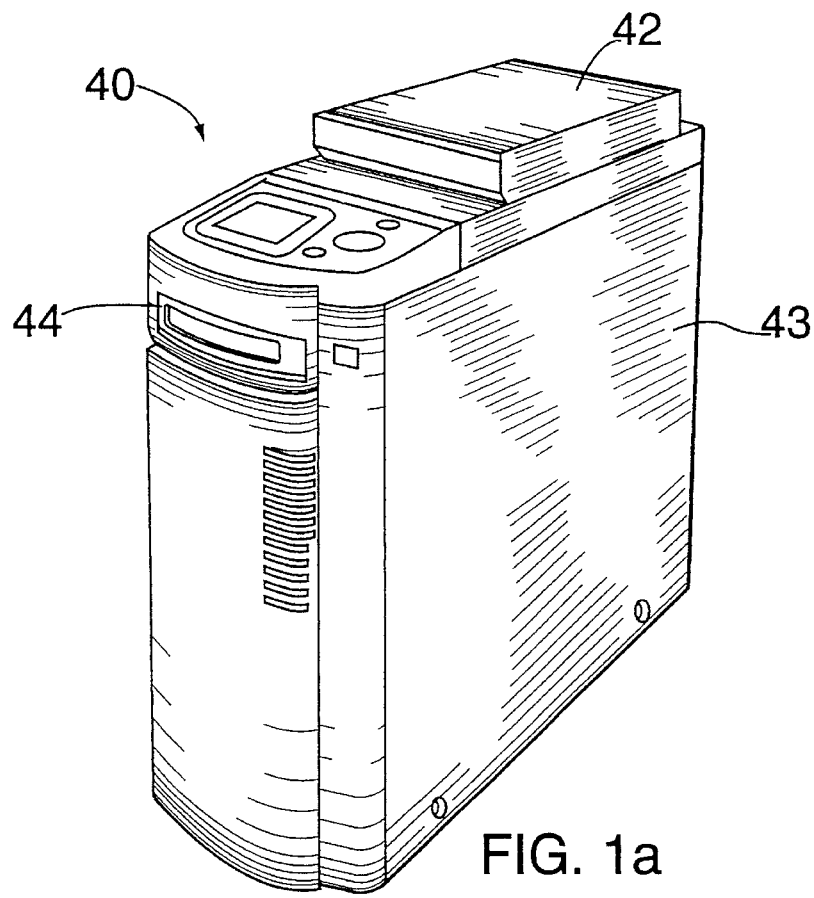
FIG. 1a shows an external view of an optical disk cartridge storage and retrieval device.
Figure 1B:
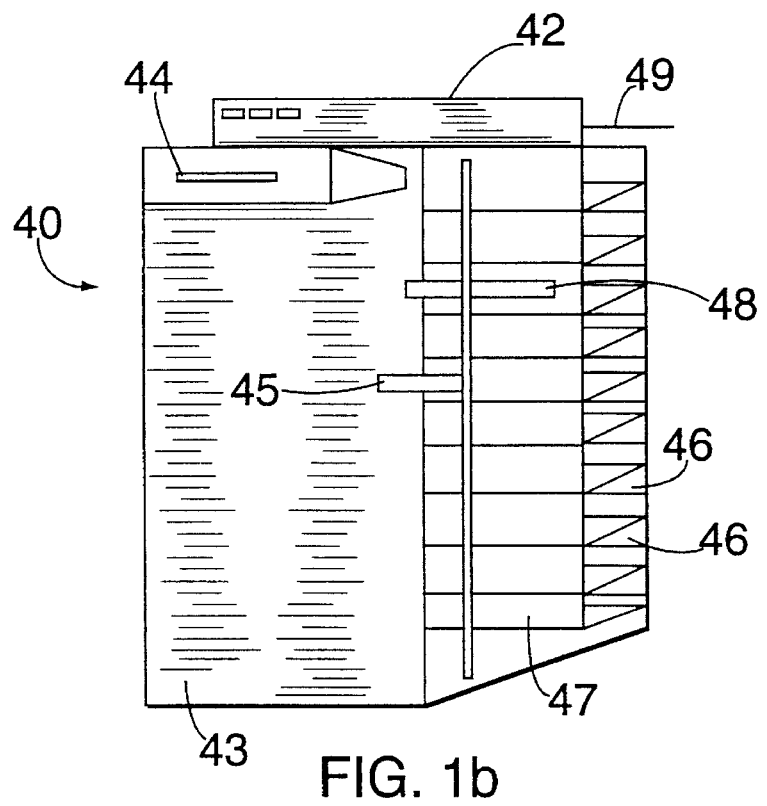
Figure 2:
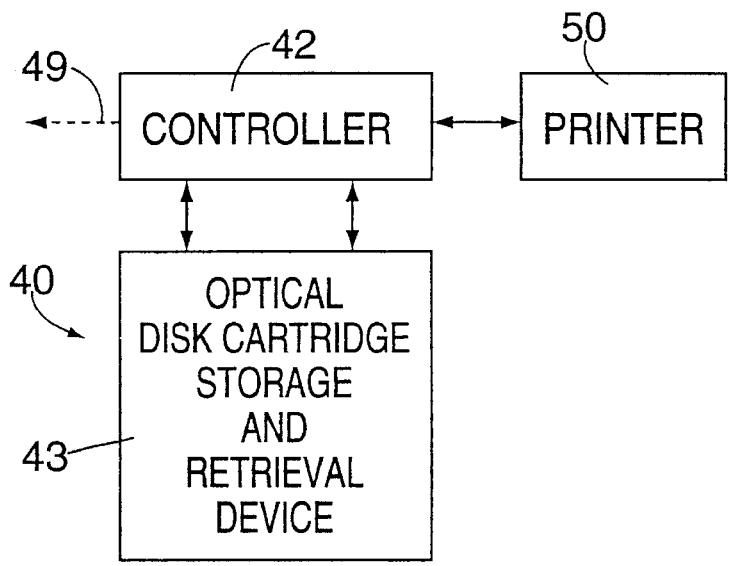
FIG. 2 shows a block diagram of one embodiment of the automatic label printing system of the present invention.

FIG. 2 shows one embodiment of the system for the automatic printing of labels for optical disk cartridges. The network-enabled optical disk cartridge storage and retrieval device 40 preferably includes two components: a control system or controller 42 and the optical storage and retrieval device 43 itself. (Again, although discussion herein is held with respect to a network-enabled optical disk cartridge storage and retrieval device, it will be understood that the invention is not limited as such, and a stand-alone, or dedicated, optical disk cartridge storage and retrieval device may instead be substituted for the network-enabled optical disk cartridge storage and retrieval device). As set forth above, the controller 42 preferably includes a CPU, memory (preferably EPROM and RAM), a disk controller (e.g., an SCSI disk controller), and a network interface (not shown). In addition, the controller 42 contains a hard disk drive (not shown) for holding software, including executable programs and an operating system, and for sewing as a cache for reading and writing accesses to increase information transfer to and from the optical disks encased by the optical disk cartridges. In one embodiment of the present invention, the CPU of the controller 42 communicates with an external printer 50 through, for example, an SCSI, parallel or serial interface (not shown). It will be appreciated, however, that the printer 50 may instead be an integrated unit with the optical disk cartridge storage and retrieval device 43.

Figure 3:
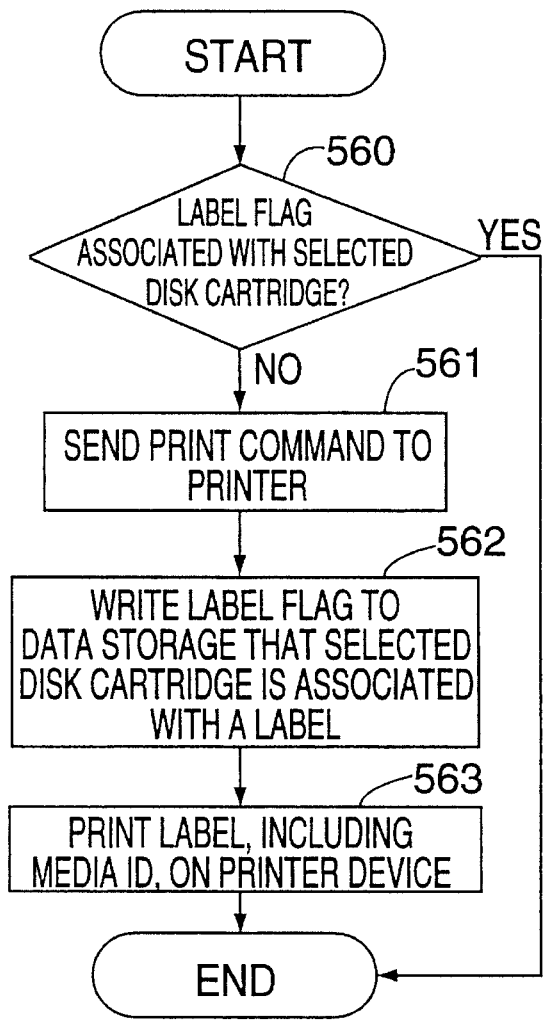
FIG. 3 shows a flow chart of one embodiment of the automatic label printing method of the present invention.

Referring now to FIG. 3, one method for the automatic printing of optical disk cartridge labels is shown. As set forth above, the optical disk cartridge storage and retrieval device 43 stores a number of optical disk cartridges, a first number of which have information stored therein, and which therefore have a media ID associated therewith. A selected one of this first number of optical disk cartridge may be inserted into the hard disk drive (not shown) of the optical disk cartridge storage and retrieval device 43, for reading of such stored information. At step S60, the controller 42 determines whether a label flag is associated with this selected optical disk cartridge. The label flag may include a signal or an embedded code, which indicates whether a label has previously been printed for this selected optical disk cartridge. Of course other examples of flags will be appreciated by those skilled in the art, and the foregoing is meant by way of example and not limitation.

If the controller 42 determines at step S60 that a label flag is not associated with this selected optical disk cartridge, it will send a print command to the printer 50 to print a label for this selected optical disk cartridge (S61). A label including the media ID of the selected optical disk cartridge will then be printed by the printer 50 (S63). The label may also include time information, including the date the label was printed, in order to facilitate organization of the optical disk cartridge. Similarly, it will be appreciated and understood by those skilled in the art that other information may be also printed thereon.

Once the controller 42 has determined that no label flag is associated with the selected optical disk cartridge and has send a command to the printer 50 to print a label for same, the controller will direct that a label flag be written to the data storage (not shown) of the optical disk cartridge storage and retrieval device 43, said label flag indicating that a label has been printed for this selected optical disk cartridge (S62). As seen in FIG. 3, this step (S62) preferably occurs prior to the printing of the label for the selected optical disk cartridge; however, it will be understood that such step may occur after the label as been printed.

Additionally, although not shown in FIG. 3, in the preferred embodiment of the present invention, the controller 42 determines whether a label flag is associated with the selected optical disk cartridge (step S60) prior to ejection of the selected optical disk cartridge from the optical disk cartridge storage and retrieval device 43. In this manner, a user will have a printed label readily available upon ejection of the optical disk cartridge, and prior to replacement of the disk cartridge in the warehouse or other storage area. Of course it will be understood that the method of this embodiment may also be adapted so that a label is printed when a label flag is associated with the selected optical disk cartridge. Other permutations will be appreciated by those skilled in the art.

It will thus be seen that under the system and method of the present invention, when the optical disk cartridge storage and retrieval device 43 and controller 42 subsequently encounter this selected optical disk cartridge, the controller will determine that a label flag is now associated with this cartridge, and thus a label has previously been printed for same. In this manner, it will be appreciated that the method of the present invention will only cause a label to be printed for an optical disk cartridge one time; preferably the first time it is ejected from the optical disk cartridge storage and retrieval device 43. Of course, it will be appreciated that suitable overrides may be provided to permit an additional or replacement label to be printed.

Figure 4:
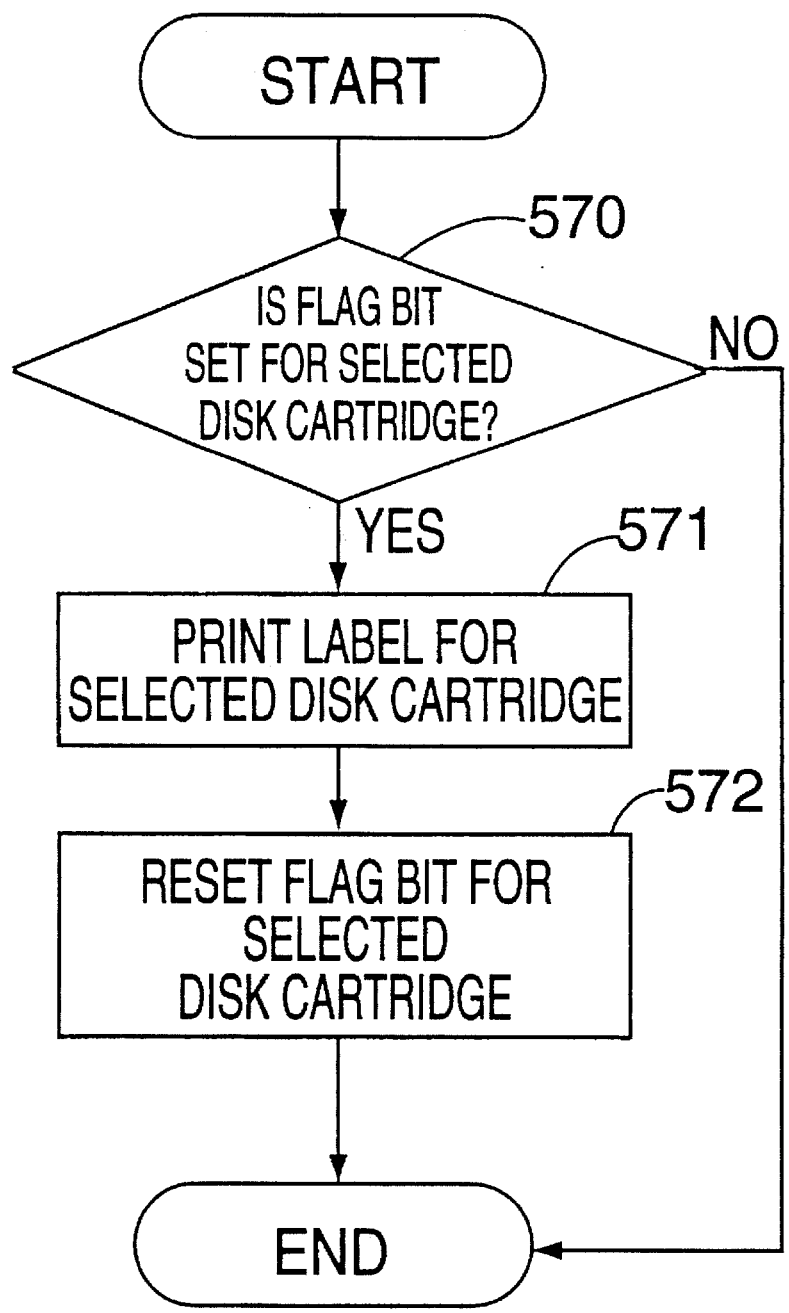
FIG. 4 shows a flow chart of an example of the embodiment of FIG. 3.

A specific example of the embodiment of FIGURE may be understood with reference to FIG. 4. In this embodiment, each of the first number of the optical disk cartridges is associated with a flag bit as well as a media ID. The optical disk cartridge storage and retrieval device 43 includes data storage (not shown) which stores the media IDs and flag bits for these cartridges. At step S70, the controller 42 determines whether the flag bit associated with a selected one of the first number is in a set or reset condition. If the flag bit associated with the selected optical disk cartridge is in a set condition, the controller causes the printer 50 to print a label, the label including the media ID of the selected optical disk cartridge and, preferably, time information, such as the date the label was printed (S71). After the controller 42 determines that the flag bit is set, and has instructed the printer to print a label, the controller 42 sends a command to reset the flag bit associated with the selected optical disk cartridge (S72). Again, the label is preferably printed when the selected optical disk cartridge is ejected from the optical disk cartridge 42. Again, it will be appreciated that the method of FIG. 4 of the present invention will only cause a label to be printed for an optical disk cartridge one time; preferably the first time it is ejected from the optical disk cartridge storage and retrieval device 43. Of course it will again be understood that method of this embodiment is not limited to the above set/reset condition of the flag bit; for example, the controller may command the printer to print a label if the flag bit is in the reset condition. Thus after printing a label, the flag bit would be placed in the set condition to indicate that a label had already been printed for the particular selected optical disk cartridge.

It will therefore be appreciated that the above described system and method of automatically printing a label to be externally affixed to an optical disk cartridge, the label including the disk cartridge's media ID.

It is further apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. For example, while discussion has been had with respect to an optical disk cartridge storage and retrieval device and optical disk cartridges, it will be appreciated that the present invention is not so limited, and may be used for the labeling of other storage media, including non-optical storage media, such as magnetic cassettes, residing in non-optical disk cartridge storage and retrieval devices. Additionally, as previously indicated, the printer may be a printing device which is integrated with the optical disk cartridge storage and retrieval device 43. Additionally, while the label may include the selected optical disk cartridge's media ID and certain time information, other information may be also printed thereon. Furthermore, the label need not be printed the when the disk cartridge is ejected from the optical disk cartridge storage and retrieval device 43, but may be printed at the command of, and under the direction of, the user. Other embodiments will occur to those skilled in the art. Accordingly, it is intended that the present invention embrace all such alternatives, modifications and variations as fall within the scope of the appended claims.

What is claimed is:

1. A method of automatically printing a label for any of a plurality of disk cartridges residing in a disk cartridge storage and retrieval device, wherein each of a first number of said plurality of disk cartridges is associated with a media ID, the method comprising the steps of:

determining through a controller of said disk cartridge storage and retrieval device, whether a label flag is associated with a selected one of said first number of disk cartridges; and, printing a label through a printer connected to said disk cartridge storage and retrieval device when said controller means determines that said selected one of said first number of said disk cartridges is not associated with a label flag, said label comprising said media ID associated with said selected disk cartridge.

2. The method of claim 1, wherein said disk cartridge storage and retrieval device comprises an optical disk cartridge storage and retrieval device, and said disk cartridges comprise optical disk cartridges.

3. The method of claim 1, wherein said controller comprises a control unit, said control unit including a CPU.

4. The method of claim 1, wherein said label further comprises time information, including the date when said label is printed by said printer.

5. The method of claim 1, wherein said label comprises a self-adhesive label.

6. The method of claim 1, wherein said plurality of disk cartridges are inserted and ejected through mail slots in said disk cartridge storage and retrieval device, and wherein said determining step occurs prior to ejection of said selected one of said disk cartridges from said disk cartridge storage and retrieval device.

7. A method of automatically printing a label for any of a plurality of optical disk cartridges residing in an optical disk cartridge storage and retrieval device, wherein each of a first number of said plurality of optical disk cartridges is associated with a media ID, the method comprising the steps of:

determining whether a label has been previously generated for a selected one of said first number of optical disk cartridges;

sending to a printer connected to said optical disk cartridge storage and retrieval device, a print command to print a label when a label has not been previously generated for said selected one of said optical disk cartridges; and, printing a label when said printer receives said print command, said label comprising said media ID associated with said selected optical disk cartridge.

8. The method of claim 7, wherein said optical disk cartridge storage and retrieval device includes data storage means, and further comprising the step of:

writing to data storage means an indicator after said print command sending step, said indicator indicating that said label has been previously generated for said selected one of said optical disk cartridges.

9. The method of claim 8, wherein said data storage means comprises a magneto-optical disk drive.

10. A method of automatically printing a label for any of a plurality of optical disk cartridges residing in an optical disk cartridge storage and retrieval device, wherein each of a first number of said plurality of optical disk cartridges is associated with a media ID and a flag bit, and wherein said optical disk cartridge storage and retrieval device includes a data storage device for storing said media IDs and said flag bit, the method comprising the steps of:

determining whether said flag bit associated with a selected one of said first number of optical disk cartridges is in a set or reset condition; and, when it is determined that said flag bit associated with said selected optical disk cartridge is in a set condition:
1) printing a label through a printer device connected to said optical disk cartridge storage and retrieval device; and, 2) resetting said flag bit associated with said selected optical disk cartridge, wherein said label comprises said media ID associated with said selected optical disk cartridge.

11. A system for automatically printing a label for a disk cartridge, comprising:
   a disk cartridge storage and retrieval device for storing a plurality of disk cartridges, each of a first number of said plurality of disk cartridges being associated with a media ID, said disk cartridge storage and retrieval device including controller means for determining whether a label flag is associated with a selected one of said plurality of disk cartridges; and,
   a printer connected to said disk cartridge storage and retrieval device for printing a label when said controller means determines that a label flag is not associated with said selected one of said disk cartridges, said label comprising said media ID associated with said disk cartridge.

12. The system of claim 11, wherein said disk cartridge storage and retrieval device comprises an optical disk cartridge storage and retrieval device, and said disk cartridges comprise optical disk cartridges.

13. The system of claim 11, wherein said controller means comprises a control unit, said control unit including a CPU.

14. The system of claim 11, wherein said disk cartridge storage and retrieval device includes data storage means for storing said label flag, said label flag indicating whether a label has been printed for said selected one of said disk cartridges.

15. The system of claim 11, wherein said label comprises a self-adhesive label.

16. A method of automatically printing a label for any of a plurality of optical disk cartridges residing in an optical disk cartridge storage and retrieval device, wherein said optical disk cartridge storage and retrieval device includes an internal printer device, and wherein each of a first number of said plurality of optical disk cartridges is associated with a media ID, the method comprising the steps of:
   determining through a controller of said optical disk cartridge storage and retrieval device, whether a label has been previously generated for a selected one of said first number of optical disk cartridges; and,
   printing a label through said internal printer device when said controller determines that a label has not been previously generated for said selected one of said first number of optical disk cartridges, said label comprising said media ID associated with said selected optical disk cartridge.

17. The method of claim 16, wherein said plurality of optical disk cartridges are inserted and ejected through mail slots in said optical disk cartridge storage and retrieval device, and wherein said determining step occurs prior to ejection of said selected one of said optical disk cartridges from said optical disk cartridge storage and retrieval device.

18. A method of automatically printing a label for any of a plurality of optical disk cartridges residing in an optical disk cartridge storage and retrieval device, wherein each of a first number of said plurality of optical disk cartridges is associated with a media ID and a flag bit, and wherein said optical disk cartridge storage and retrieval device includes an internal printer device and a data storage device for storing said media IDs and said flag bit, the method comprising the steps of:
   determining through a controller of said optical disk cartridge storage and retrieval device whether said flag bit associated with a selected one of said first number of optical disk cartridges is in a set or reset condition; and,
   when said controller determines that said flag bit associated with said selected optical disk cartridge is in a set condition: 1) printing a label through said internal printer device; and, 2) resetting said flag bit associated with said selected optical disk cartridge, wherein said label comprises said media ID associated with said selected optical disk cartridge.

19. A system for automatically printing a label for an optical disk cartridge, comprising an optical disk cartridge storage and retrieval device for storing a plurality of optical disk cartridges, each of a first number of said plurality of optical disk cartridges being associated with a media ID, said optical disk cartridge storage and retrieval device including a controller for determining whether a label flag is associated with said selected one of said plurality of optical disk cartridges, said optical disk cartridge storage and retrieval device further including a printer device for printing a label when said controller determines that a label flag is not associated with said selected one of said optical disk cartridges, said label comprising said media ID associated with said optical disk cartridge.

20. The system of claim 19, wherein said optical disk cartridge storage and retrieval device includes data storage means for storing said label flag, said label flag indicating whether a label has been printed for said selected one of said optical disk cartridges.

21. The system of claim 19, wherein said label comprises a self-adhesive label.

22. The system of claim 20, wherein said data storage means comprises a magneto-optical disk drive.

23. A method of automatically printing a label for any of a plurality of optical disk cartridges residing in an optical disk cartridge storage and retrieval device, wherein each of a first number of said plurality of optical disk cartridges is associated with a media ID, and wherein said plurality of optical disk cartridges are inserted and ejected through mail slots in said optical disk cartridge storage and retrieval device, the method comprising the steps of:
   determining whether a label flag is associated with a selected one of said first number of optical disk cartridges;
   ejecting said selected optical disk cartridge from said optical disk cartridge storage and retrieval device;
   printing a label through a printer connected to said optical disk cartridge storage and retrieval device when it is determined that a label flag is not associated with said selected one of said first number of optical disk cartridges, said label comprising said media ID associated with said selected optical disk cartridge and time information including the date when said label is printed; and,
   writing to data storage means in said optical disk cartridge storage and retrieval device a label flag, said label flag indicating that a label has been printed for said selected optical disk cartridge.

24. A system for automatically printing a label for an optical disk cartridge, comprising:
   an optical disk cartridge storage and retrieval device for storing a plurality of optical disk cartridges, each of a first number of said plurality of optical disk cartridges being associated with a media ID, said optical disk cartridge storage and retrieval device including a control unit for determining whether a label flag is associated with a selected one of said plurality of optical disk cartridges and a data storage device for storing a label flag, said label flag indicating whether a label has been printed for said selected one of said optical disk cartridges; and, a printer connected to said optical disk cartridge storage and retrieval device for printing a label when said controller unit determines that a label flag is not associated with said selected one of said optical disk cartridges, said label comprising said media ID associated with said optical disk cartridge.

* * * * *